July 13, 1926.
W. RECHT
1,592,539
CHARGING NIPPLE FOR BATTERY JARS
Filed August 11, 1925
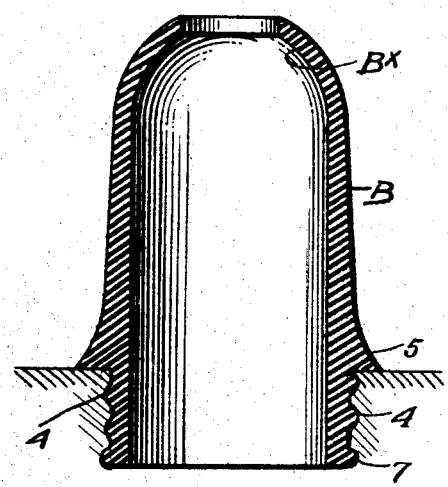
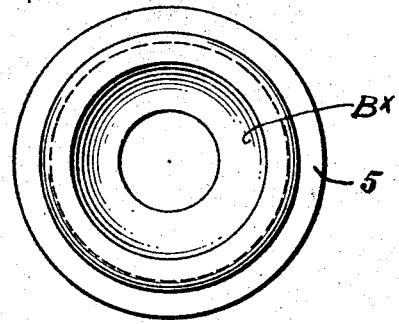
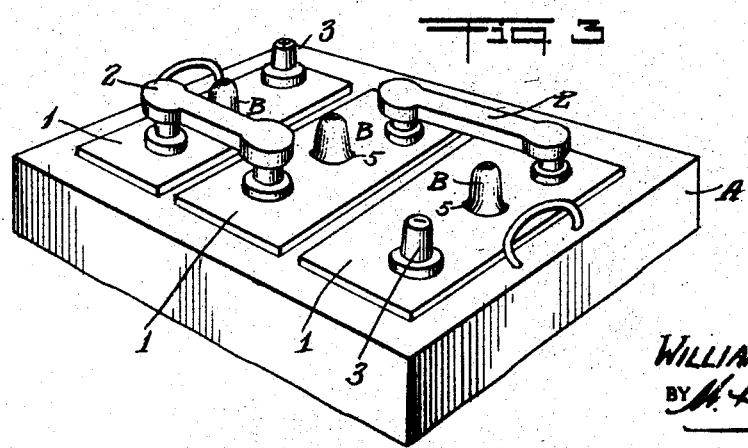
INVENTOR
WILLIAM RECHT
BY
ATTORNEY Patented July 13, 1926.

1,592,539

UNITED STATES PATENT OFFICE.

WILLIAM RECHT, OF NEW YORK, N. Y.

CHARGING NIPPLE FOR BATTERY JARS.

Application filed August 11, 1925. Serial No. 49,557.

The object of the invention is to provide means for protecting the filling ports of an electrical storage battery during charging thereof, whilst leaving said ports open for the discharge of gases and the insertion of a hydrometer to enable ready inspection as to gravity of the electrolyte.

The invention will be understood by reference to the accompanying drawing, in which—

Figure 1 illustrates in sectional elevation an embodiment of the invention;

Figure 2 is a bottom plan view of the embodiment illustrated in Figure 1;

Figure 3 is a perspective view showing the upper portion of a storage battery equipped with the invention.

Referring to Figure 3 of the drawing, it will be seen that a usual form of electrical storage battery is illustrated, comprising a box A, three cells 1, cross leads 2, and terminals 3. In the centre of each cell there is formed, as usual, a port for the passage of electrolyte and distilled water to the interior of the cell. The said port is customarily closed by means of a removable filler cap or plug which is usually threaded to correspond with a thread formed in the wall of the port, as for example the thread indicated at 4, Figure 1.

During the charging of a storage battery it is customary to remove the filler caps not only to permit gases to leave the cells as generated, but to enable ready test of the cells by a hydrometer. These gases are rapidly formed and pass upwardly from the electrolyte carrying small particles of the latter in the form of tiny bubbles, and these bubbles or small particles of electrolyte are projected above the upper surface of the cell and frequently into contact with articles which are injured by the acid. For example, cross currents of air will frequently meet the acid particles and will carry them beyond the battery case and into contact with rugs or clothing, or the particles will be so carried by the impulse of the gases alone.

My charging nipple B is preferably formed of vulcanite or semi-hard rubber. Its base portion is adapted to fit within the filling port of the battery cell, and it is formed with a flange 5 to form a seat for the nipple and also to limit the degree of movement of the base portion into the filling port. Above flange 5 the nipple rises to a point where its wall converges and forms a member $B^x$ overhanging the port. The centre of this member is formed with an aperture for the insertion of a hydrometer tube. The particles of acid thrown upwardly through the filling port are shielded from air currents by the nipple and either fall back by gravity or strike the inner wall of the nipple, and, as accumulated, flow back into the cell.

If desired the base of the nipple may be slightly elastic or compressible or may be provided with a compressible ring, such as the ring 7 which in this instance is integral with the nipple, so as to enable a fairly tight fit of the nipple within the filling port. Or the base of the nipple may be threaded to correspond with the threads of the port wall if desired.

Having described my invention what I claim and desire to secure by Letters Patent is as follows:—

A charging nipple for storage batteries, comprising a base member adapted to fit within the filler port of a storage battery and a hollow relatively long, narrow upward extension having formed at its top an opening for the passage of gases and the reception of a hydrometer tube, said extension being provided with an exterior seat above the base member, and the walls of the said upward extension converging to overhang the port of the battery when the nipple is seated therein.

In testimony whereof, I have signed my name to this specification.

WILLIAM RECHT.